United States Patent
Nelson et al.

(10) Patent No.: US 7,747,946 B2
(45) Date of Patent: Jun. 29, 2010

(54) SYSTEM AND METHOD FOR ADORNING SHAPES WITH DATA DRIVEN OBJECTS

(75) Inventors: Mark T. Nelson, Kirkland, WA (US); Cathy L. McBride, Seattle, WA (US); Michael J. Woolf, Kirkland, WA (US); Patrick Leahy, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 835 days.

(21) Appl. No.: 11/105,115

(22) Filed: Apr. 11, 2005

(65) Prior Publication Data

US 2006/0230342 A1 Oct. 12, 2006

(51) Int. Cl.
G06F 17/00 (2006.01)
G06F 17/20 (2006.01)
(52) U.S. Cl. ...................... 715/243; 345/619
(58) Field of Classification Search ............... 715/517, 715/243
See application file for complete search history.

(56) References Cited

U.S. PATENT DOCUMENTS

| | | | | |
|---|---|---|---|---|
| 5,414,809 | A * | 5/1995 | Hogan et al. | 715/765 |
| 5,706,456 | A * | 1/1998 | Dupper et al. | 715/839 |
| 5,838,907 | A * | 11/1998 | Hansen | 709/220 |
| 5,870,552 | A * | 2/1999 | Dozier et al. | 709/219 |
| 6,393,425 | B1 * | 5/2002 | Kelly | 1/1 |
| 6,393,432 | B1 * | 5/2002 | Flansburg et al. | 707/104.1 |
| 6,781,600 | B2 * | 8/2004 | Anwar | 345/629 |
| 7,023,453 | B2 * | 4/2006 | Wilkinson | 345/643 |
| 2002/0052941 | A1 * | 5/2002 | Patterson | 709/223 |
| 2003/0130821 | A1 * | 7/2003 | Anslow et al. | 702/186 |
| 2005/0120030 | A1 * | 6/2005 | Varpela et al. | 707/100 |
| 2006/0041564 | A1 * | 2/2006 | Jain et al. | 707/100 |
| 2006/0095461 | A1 * | 5/2006 | Raymond | 707/102 |

OTHER PUBLICATIONS

Pascucci et al.,"Efficient Computation of the Topology of Level Sets",IEEE, 2002, pp. 187-194.*
Eiglsperger et al.,"A Topology-Shape-Metrics Approach for the Automatic Layout of UML Class Diagrams", ACM, 2003, pp. 189-217.*
Eiglsperger et al.,"A Topology-Shape Metric Approach for the Automatic Layout of UML Class Diagrams", ACM, 2003, pp. 189-217.*
Peters et al.,"Impact of the access network topolgy on the handoff performance", Kluwer Academic Publishers, 2007, pp. 203-220.*
Li et al, "A First-Principle Approach to Understanding the Internet's Router-level Topology", ACM, 2004, pp. 3-14.*

* cited by examiner

*Primary Examiner*—Doug Hutton
*Assistant Examiner*—James J Debrow
(74) *Attorney, Agent, or Firm*—Merchant & Gould, P.C.

(57) ABSTRACT

Adornments are applied to shapes in a diagram that graphically displays data about those shapes. Once the adornments are applied to a shape, the information displayed is automatically updated as the underlying shape data changes. The appearance of the diagram is updated automatically when the user updates the data for their shapes. The set of adornments that may be applied to shapes is extensible. A mechanism and interface is defined for creating additional adornments that have customized looks or behaviors.

16 Claims, 8 Drawing Sheets

SYSTEM AND METHOD FOR ADORNING SHAPES WITH DATA DRIVEN OBJECTS

BACKGROUND OF THE INVENTION

Diagrams are useful for conveying a large amount of data quickly and efficiently. In conventional diagrams, information is often conveyed through a combination of geometric symbols ("shapes"). The shapes may be arranged in a variety of ways, and depending on the arrangement, can represent a variety of data. For example, charts, graphs, flow diagrams, timelines are just some of the diagrams that may be used to convey information. Often, more than one diagram style may be chosen to represent the same information to a viewer.

The shape may be seen as the essential building block for a diagram. Data that describes the properties of the shape is often conveyed through the use of a label. Generally, labels have been limited in the amount of information they convey, and the methods in which they present that information. Most often, a label is simply a block of text that either supplies a name to the shape or describes some properties of the shape. Also, the properties of the shape may change as the data which the shape represents changes. For example, a diagram showing a network topology may correspond to a stored spreadsheet listing of the nodes on the network. Therefore, when a new node is added to the network, the data in the spreadsheet needs to be updated. In addition, the diagram must be updated, along with the labels for the included shapes. Without the ability to surface data changes in the diagram more efficiently, or the ability to represent properties of shapes in a greater variety of ways, it remains difficult for a user to construct a compelling visual diagram that adequately conveys the desired information.

SUMMARY OF THE INVENTION

The present invention generally relates to a system and method that solves for the above-mentioned limitations by applying adornments to shapes in a diagram that graphically displays data about those shapes. Once the adornments are applied to a shape, the information displayed is automatically updated as the underlying shape data changes. The appearance of the diagram is updated automatically when the user updates the data for their shapes. The set of adornments that may be applied to shapes is extensible. A mechanism and interface is defined for creating additional adornments that have customized looks or behaviors.

Additionally, the invention includes a provision for managing the set of adornments applied to shapes. A "data display format" can be defined as a set of adornments and stored in a document. The user can then reuse this data display format on other shapes in the diagram. In some cases, the shapes do not have to have similar data properties. These data display formats also adapt to a variety of shape sizes and configurations. One part of the management features for data display formats is the ability to modify the definition of the data display format and automatically update the adornments on all the shapes that utilize that data display format in the drawing. Thus, users may change the look or behavior of the adornments across the drawing in just a few steps. Additionally, data and behavioral inputs by the user may be converted into a set of formulaic properties on the shapes. The adornments on shapes may be implemented as shapes themselves. These shapes have sets of unique formula patterns that make them respond to and reflect the underlying data.

In accordance with one aspect of the present invention, a method for adorning shapes in a document with underlying data includes importing the data into the document, wherein a first entry of the underlying data is associated with a first shape of the document in a first adornment. The first entry of the underlying data is displayed in the document such that the first entry is displayed in proximity with the first shape according to a data display format. A determination is made whether additional shapes that are associated with the data display format exist in the document. A selection is made whether to update the additional shapes to correspond to the first shape. The additional shapes are updated to correspond to first shape when the additional shapes are present in the document and are selected to be updated.

In accordance with another aspect of the present invention, a drawing application includes computer-executable instructions for associating a first entry of the underlying data with a first shape of the document in a first adornment. The application displays the first entry of the underlying data in the document such that the first entry is displayed in proximity with the first shape according to a data display format. A determination is made whether additional shapes that are associated with the data display format exist in the document. A selection is made whether to update the additional shapes to correspond to the first shape. The additional shapes are updated to correspond to first shape when the additional shapes are present in the document and are selected to be updated.

DETAILED DESCRIPTION

The present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
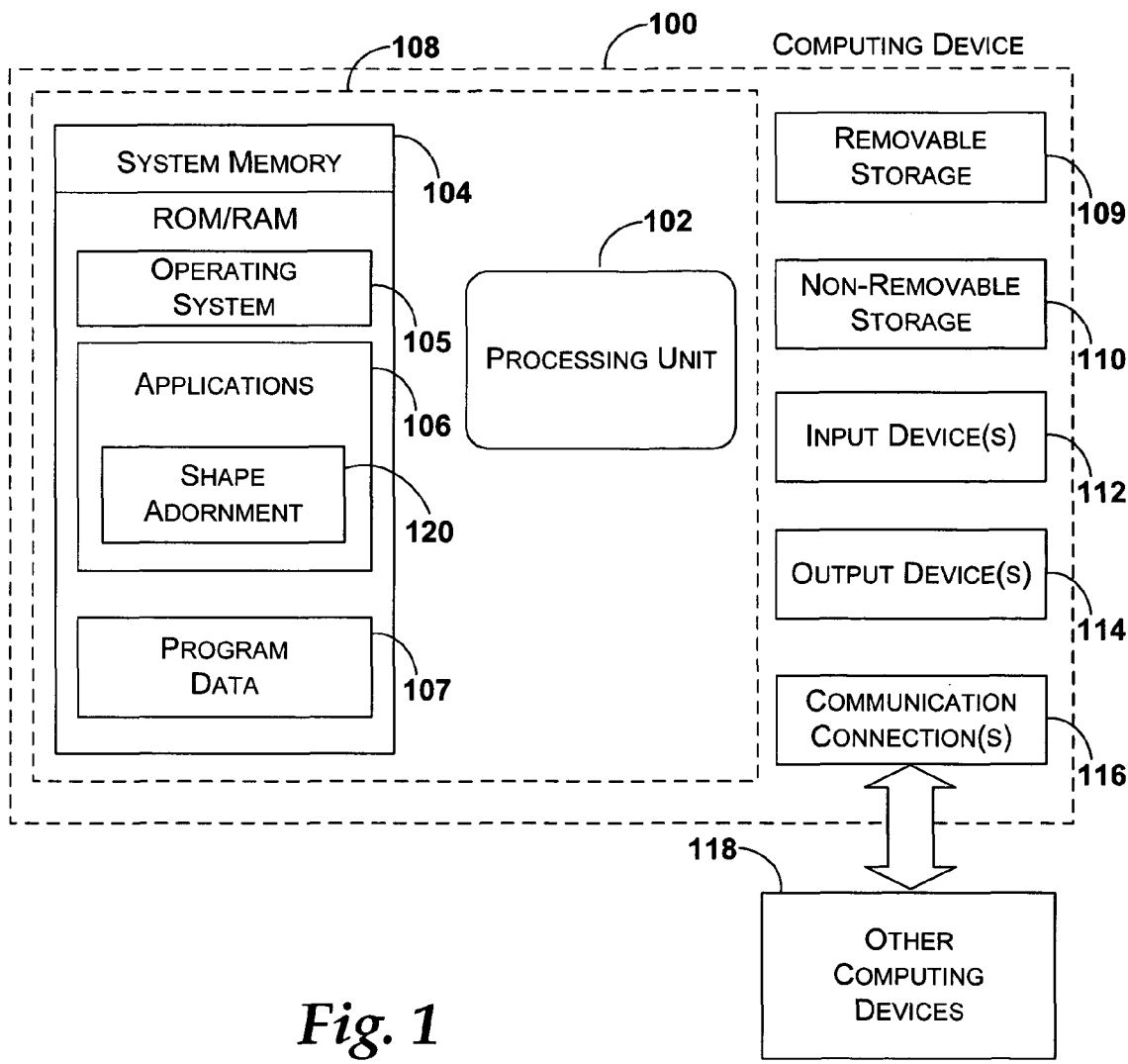
FIG. 1 illustrates an exemplary computing device that may be used in one exemplary embodiment of the present invention.

With reference to FIG. 1, one exemplary system for implementing the invention includes a computing device, such as computing device 100. Computing device 100 may be configured as a client, a server, mobile device, or any other computing device. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 includes a shape adornment application 120 for implementing the functionality of the present invention. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Embodiment for Adorning Shapes with Data Driven Objects

As used herein throughout the specification and the claims, the terms "data display" and "adornment" are used interchangeably to describe data driven objects, shapes, and values added to a diagram to impart additional information about shapes in the diagram. "Data display format" refers to the collection of text, callouts, and formatting applied to the shapes of the diagram to expose the related data. A "callout" often refers to a particular adornment that is an external object or shape added to a diagram shape that imparts data regarding the diagram shape. Additionally, the terms "diagram" and "document" are also used interchangeably throughout the specification and claims to denote the document that that contains the shapes being adorned.

Embodiments of the present invention are generally related to applying adornments or data displays to shapes in a diagram. Once the adornments are applied to a shape, the information displayed is automatically updated as the underlying shape data changes. The appearance of the diagram is updated automatically when the user updates the data for their shapes. The set of adornments that may be applied to shapes is extensible. A mechanism and interface is defined for creating additional adornments that have customized looks or behaviors.

Figure 2:
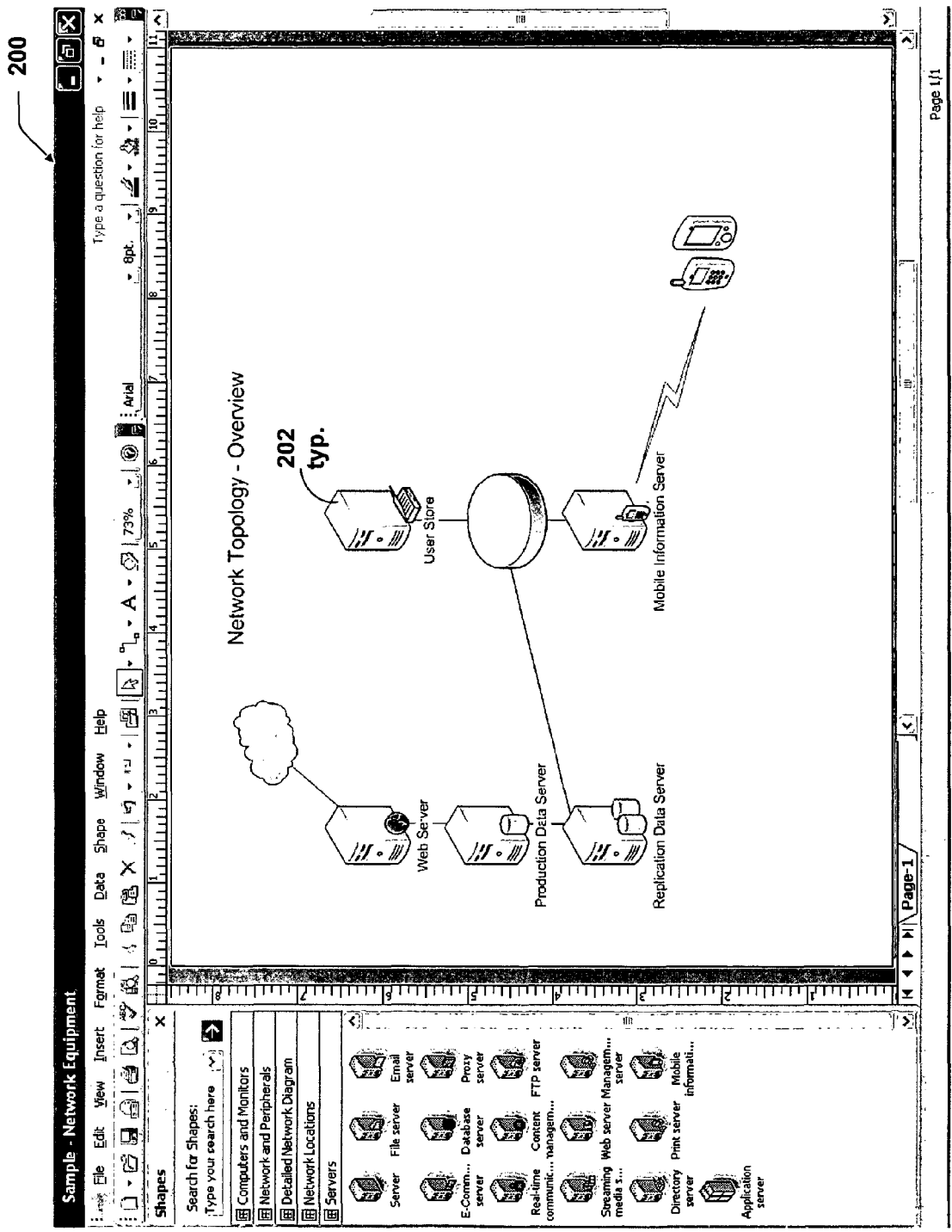
FIG. 2 illustrates a screenshot of an example diagram for a network topology.

FIG. 2 illustrates a screenshot of an example diagram for a network topology. The network topology is represented by shapes (e.g., 202) that represent servers, databases, and other computing devices that comprise the network. In other embodiments, the diagram may contain different shapes and the network topology example is provided for explanation purposes only.

Additionally, screenshot 200 and other screenshots included in the present application comprise many different portions, toolbars, dropdown menus, and templates that are not labeled since these portions of the screenshots are common among other diagram and drawing creation software applications. Except for the drop-down menus, dialogue boxes, and other portions of the software application that are pertinent to the present invention, these portions of the software application are not explained in detail herein.

Screenshot 200 illustrates the network topology and the interrelation among the servers, databases, and computing devices, but does not provide detailed information about the components of the network themselves. Without this additional information included in the diagram, a user is required to store and retrieve this information from a separate location.

Figure 3:
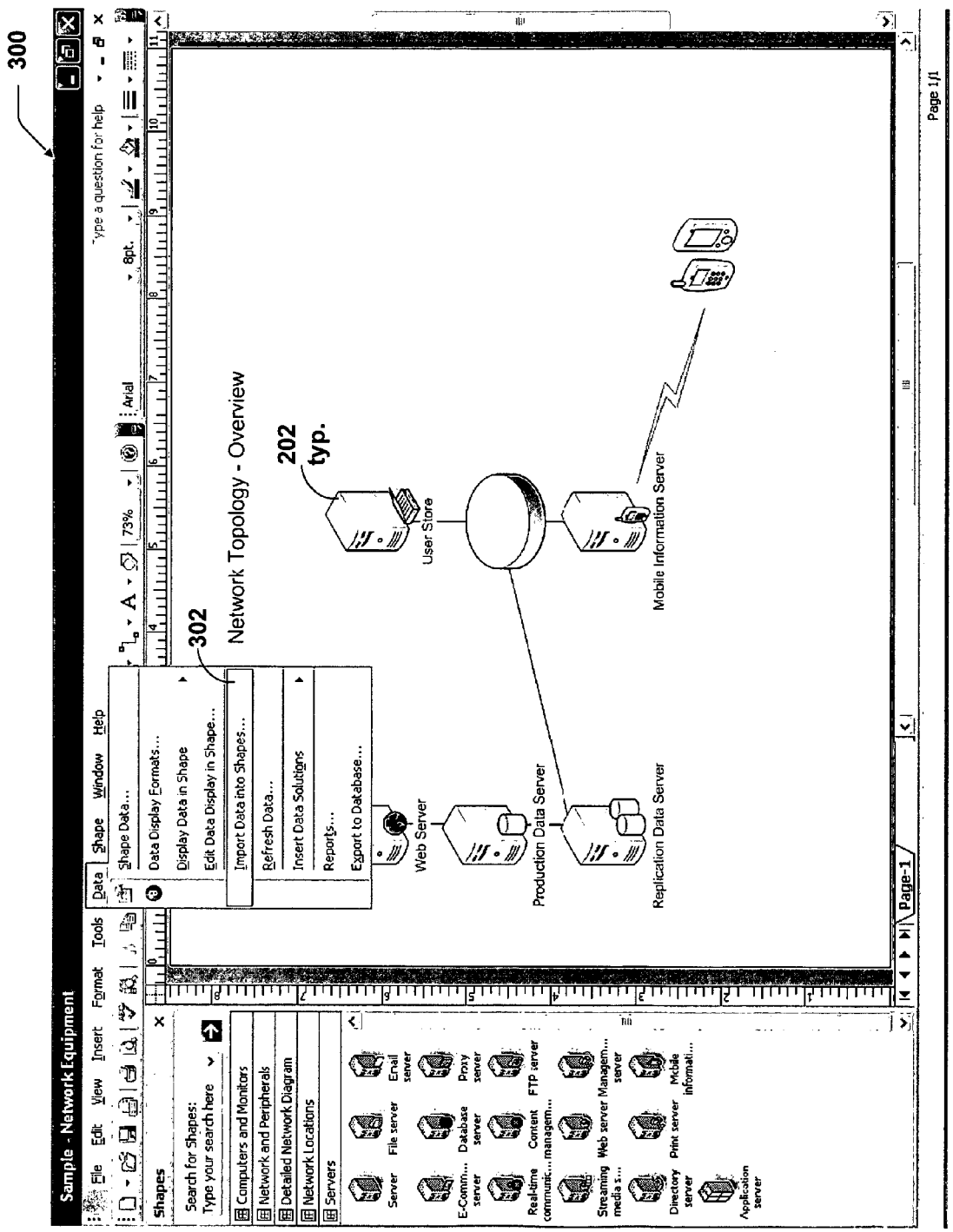
FIG. 3 illustrates a screenshot of an example diagram for a network topology with a selection for importing data in accordance with the present invention.

FIG. 3 illustrates a screenshot of an example diagram for a network topology with a selection for importing data in accordance with the present invention. The network topology is similar to the network topology shown in screenshot 200 with similar elements labeled similarly. Additionally, screenshot 300 illustrates a pull-down menu selection 302 for importing data into the shapes. While data mapping and importing of data between applications is known in the art, the present invention goes beyond previous drawing applications and provides a method to directly link and surface the information in connection with the shapes of the diagram.

In one embodiment, when the data is imported the data is stored within a cache or database associated with the diagram. The cache of data may be updated automatically with the data source such that the adornments of data associated with the shapes are also updated. In a further embodiment, when the data is first imported into the diagram the data is search for terms among the data entries that are similar with shape descriptions in the diagram. When similar terms are located, the adornment of the shape may be automatically added or updated to reflect the data underlying data entry.

Figure 4:
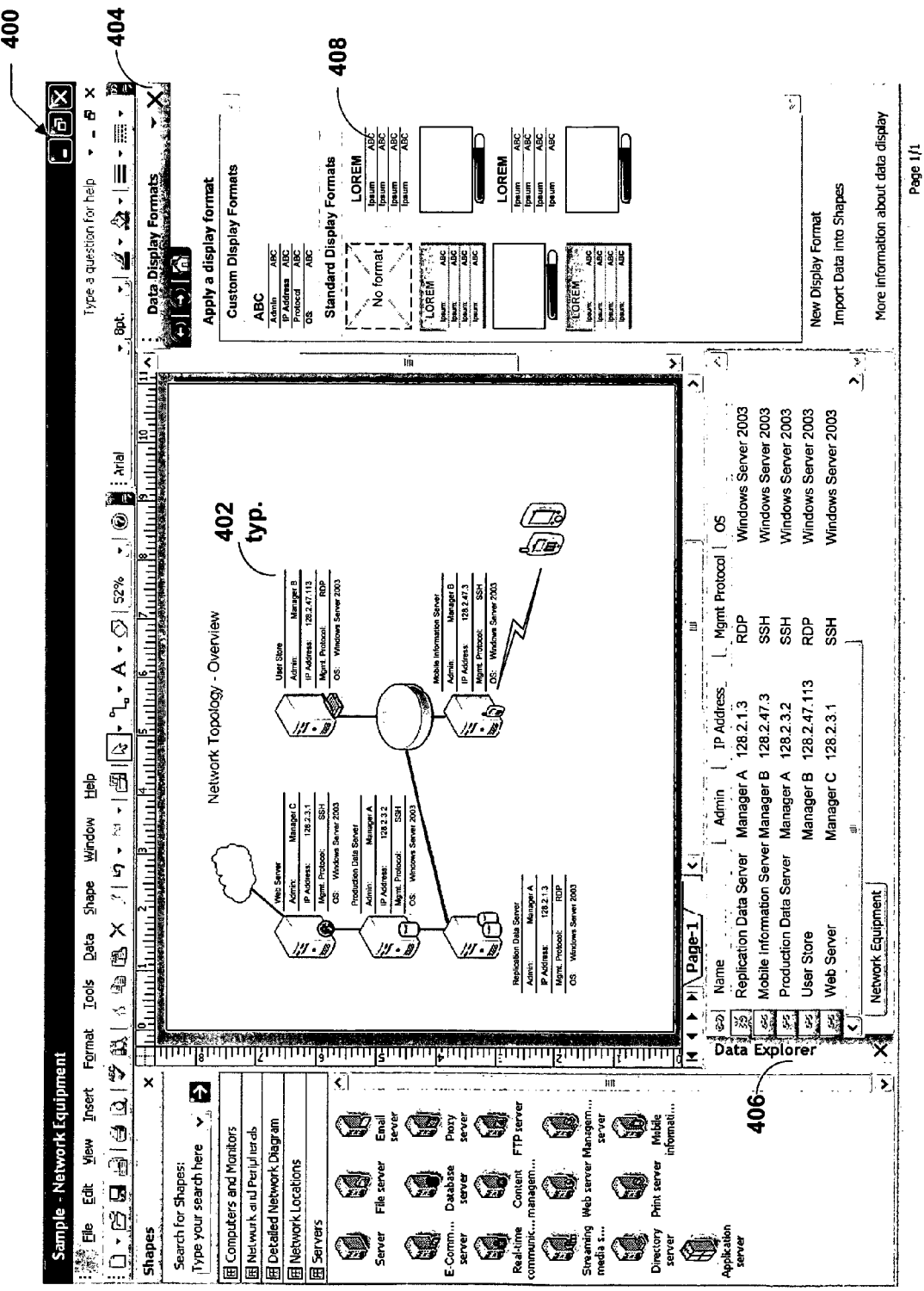
FIG. 4 illustrates a screenshot of an example diagram for a network topology that includes adornments in accordance with the present invention.

FIG. 4 illustrates a screenshot of an example diagram for a network topology that includes adornments in accordance with the present invention. Screenshot 400 is similar to the screenshots of FIGS. 2 and 3 with the addition of the adornments with the shapes (e.g., 402) and the tool panes (e.g., 404 and 406) for editing and creating the adornments. The tool panes included are a data display format task pane 404 and a data explorer pane 406.

Data display format task pane 404 allows a user to select and customize the data display format of the adornments (e.g., 402). An exemplary process for applying an adornment is described further in the discussing of FIG. 9 below. In additional embodiments, pop-up windows and other windows may be provided in connection with data display format task pane 404 that allow a user to edit and manage the various data display formats (e.g., 408). In one embodiment, the display formats are separated into categories of Custom and Standard. Custom formats are stored locally in the document. They typically have display items that are matched to particular data fields on shapes. Standard formats are stored outside the document. These are found in central repositories and available to all documents. Standard formats typically have placeholder data fields assigned to them and can be used with any shape data. If there are no formats for one of the categories, that category heading is not shown. In a further embodiment, the first format in the Standard formats category is "No format." This format option is used to remove any display format from shapes.

Data explorer pane 406 represents a view of the cached data contained stored locally in the document. In another embodiment, data explorer pane 406 provides a partial view of the original data source through a data link to the original source.

Adornments (e.g., 402) associated with each shape may take on many different formats. For example, the adornment may be text within a callout shape. The example shown in screenshot 400 is an example of a callout populated with text associated with the underlying data. Another example is a color by value adornment, wherein the color of the shape itself is selected to represent a value of the underlying data. For example, as may be seen in data explorer pane 406, the operating system (OS) associated with each of the network elements is listed as WINDOWS SERVER 2003 produced by Microsoft Corporation of Redmond, Wash. A color by value adornment of the shapes may be selected so that each shape operating with a particular OS is one color while all others are a different color. In this way, a user is able to associate a data value with the shape that is immediately recognized by viewers of the document. Still another adornment type is a data graphic, wherein a callout shape may be associated with a shape to surface a value. For example, a fill bar may be adorned on the shape that has a fill level based on the value in the underlying data. In the network topology example, the network manager may desire to show the percentage utilization of each of the elements within the network. Then a fill bar can be place in or near each element showing its percent utilization as a fill level of the bar. Yet another example adornment type is an icon set, where a set of icons is associated with a shape based on the underlying data. For example, if a network element were currently disabled, a red stop sign may be included in or near the shape representing that network element. Each of these adornment types contribute to a visually compelling diagram that presents a variety of the information to a user.

In still a further embodiment, the state of an adornment associated with a shape may depend on the state of a condition. A rule may be created that changes the formatting of the diagram shape when a particular condition is true. The condition consists of a comparison between a field and a constant value or a field and another field. Multiple condition statements can be added to further enhance the visual throughput of data onto the diagram.

Figure 5:
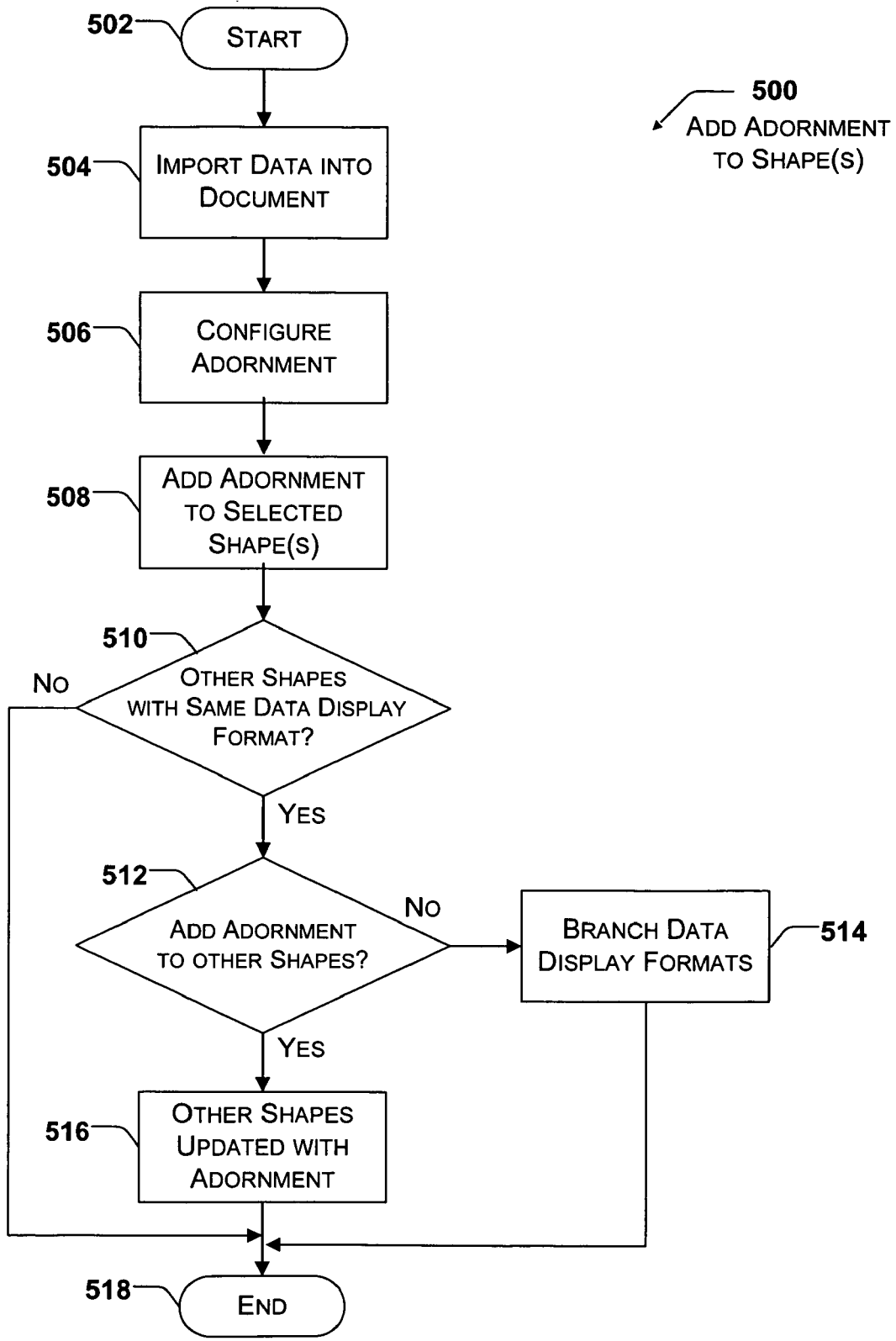
FIG. 5 illustrates a logical flow diagram of an exemplary process for adding an adornment in accordance with the present invention.

FIG. 5 illustrates a logical flow diagram of an exemplary process for adding an adornment in accordance with the present invention. Process 500 begins at block 502 where a document is generated with shapes that are related to another set of data that a user desires to surface within the document. Processing continues at block 504.

At block 504, the data is imported into the diagram so that a local cache of the data is created within the document. As previously stated, this local cache of the data may be linked with the original store so that it is updated automatically as the original store is updated. Processing continues at block 506.

At block 506, the adornment to be added to the document is configured. Configuring the adornment refers to selecting the data display format of the adornment as well as the shapes to which each entry in the underlying data applies. As previously stated, the configuration of the adornment may be automatic, where the format is automatically selected and each underlying data entry is automatically associated with a particular shape in the document. Processing continues at block 508.

At block 508, the adornment is added to the selected shape or shapes within the document. It may be that the user had multiple shapes highlighted in the document when the process to add an adornment commenced. If so, a similar adornment is added to each of the selected shapes according a particular entry in the underlying data. Processing then moves to decision block 510.

At decision block 510, a determination is made whether any other shapes have the same data display format as the shape with the just added adornment. If no other shapes have the same data display format, then processing advances to block 518 where process 500 ends. However, if other shapes do have the same data display format, then processing continues to decision block 512.

At decision block 512, a determination is made whether the other shapes having the same data display format should be updated with the adornment just added. For example, a dialogue may open that asks the user whether they desire to have the adornment added to the other shapes sharing the same data display format. If it is determined that the adornment is not to be added to the other shapes process moves to block 514 where a new data display format is generated that branches away from the previous data display format. The data display formats are logically separated to signify the difference between shapes included in the document since they do not have the same adornment applied. Once the data display formats are logically separated, processing continues to block 518 where process 500 ends.

Alternatively, if it is determined that the adornments should be added to the other shapes sharing the same data display format, then processing continues at block 516 where the other shapes are updated with the adornment. The other shapes receive the same adornment but may represent different values and/or entries in the underlying data. Once the other shapes having the same data display format are updated with the added adornment, processing continues to block 518 where process 500 ends.

Figure 6:
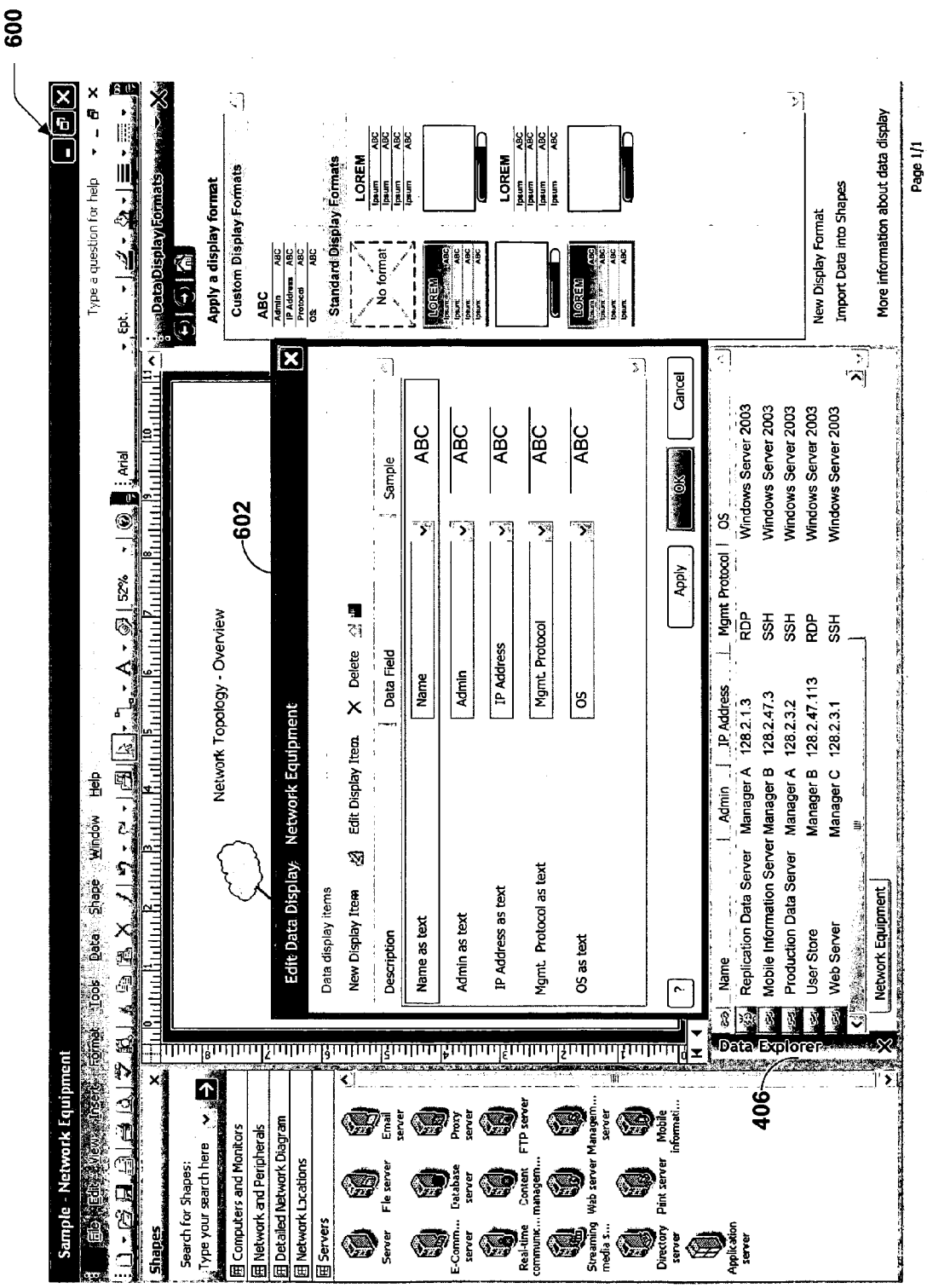
FIG. 6 illustrates a screenshot of an example diagram for a network topology that includes an edit dialogue for editing adornments in accordance with the present invention.

FIG. 6 illustrates a screenshot of an example diagram for a network topology that includes an edit dialogue for editing adornments in accordance with the present invention. In the example shown, an edit dialogue 602 is used to edit existing adornments within the document. A process for editing an adornment using an edit dialogue is described in the discussion of FIG. 7 below. In another embodiment, the adornments are directly editable in the diagram such that the changes to the document are propagated to the underlying data.

Figure 7:
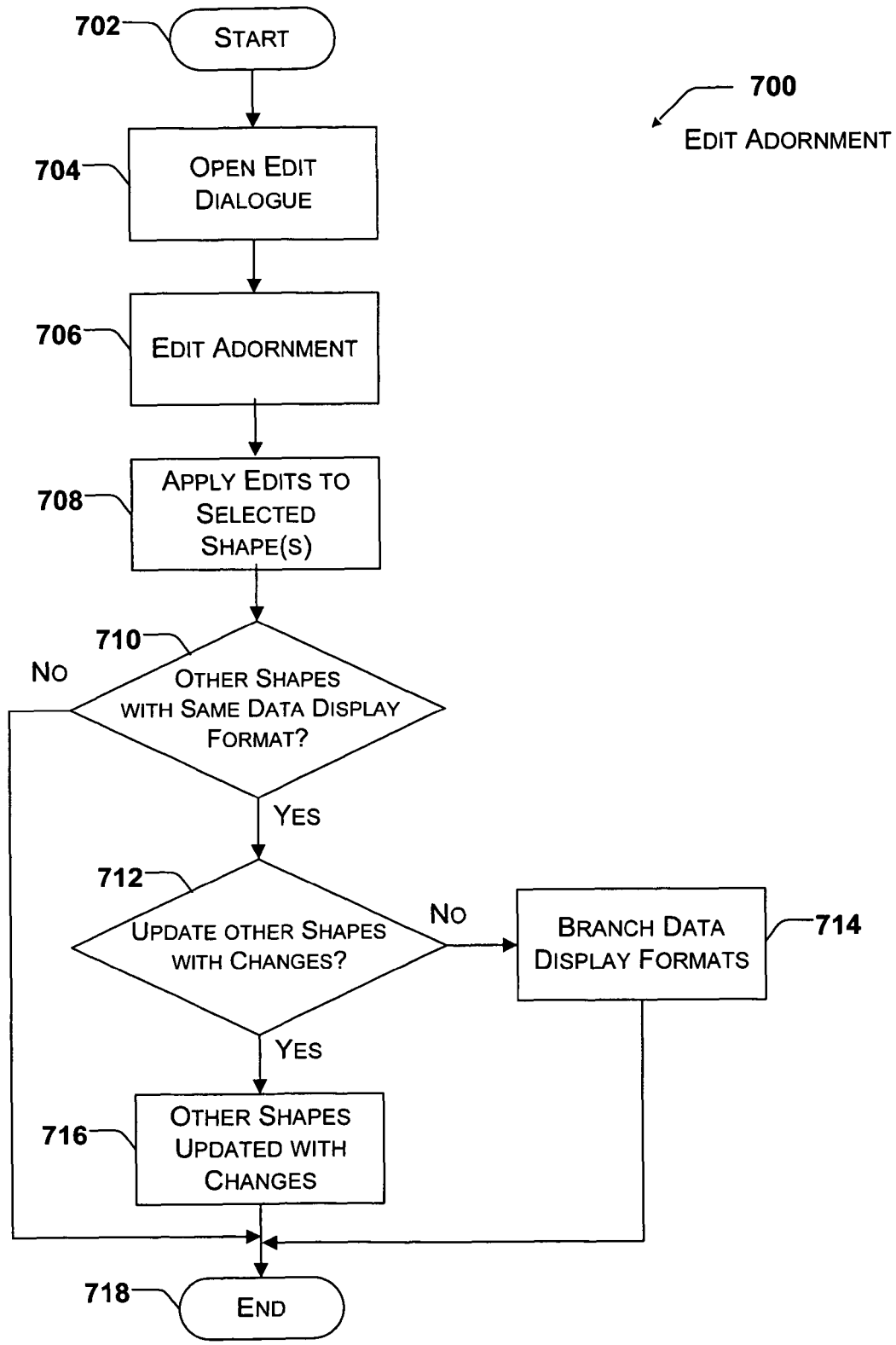
FIG. 7 illustrates a logical flow diagram of an exemplary process for editing an adornment in accordance with the present invention.

FIG. 7 illustrates a logical flow diagram of an exemplary process for editing an adornment in accordance with the present invention. Process 700 begins at block 702 where a document is generated with shapes that have one or more associated adornments corresponding to their data display format. Processing continues at block 704.

At block 704, an edit dialogue is opened to assist with the editing process. In one embodiment, the edit dialogue is similar to edit dialogue 602 shown in FIG. 6. Processing continues at block 706.

At block 706, the selected adornment is edited using the edit dialogue. A number of factors about the adornment may be edited from the substance, order and format of the content, to the position and placement of the adornment with relation to the diagram shape. Once the adornment is edited, processing continues at block 708.

At block 708, the edits made to the adornment are applied to the selected shape(s) within the document. It may be that the user had multiple shapes highlighted in the document when the process to edit an adornment commenced. If so, and the adornments are similar, then each of the adornments of the selected shapes is edited. Processing then moves to decision block 710.

At decision block 710, a determination is made whether any other shapes have the same data display format as the shape with the just edited adornment. If no other shapes have the same data display format, then processing advances to block 718 where process 700 ends. However, if other shapes do have the same data display format, then processing continues to decision block 712.

At decision block 712, a determination is made whether the other shapes having the same data display format should be updated with the edits just made to the selected adornment. For example, a dialogue may open that asks the user whether they desire to have the edits propagated to the other shapes sharing the same data display format. If it is determined that the edits are not to be propagated to the other shapes process moves to block 714 where a new data display format is generated that branches away from the previous data display format. The data display formats are logically separated to signify the difference between shapes included in the document since they do not have the same adornment applied. Once the data display formats are logically separated, processing continues to block 718 where process 700 ends.

Alternatively, if it is determined that the edits should be made to the other shapes sharing the same data display format, then processing continues at block 716 where the other shapes are updated with the edits. The other shapes are then edited similarly but may still represent different values and/or entries in the underlying data. Once the other shapes having the same data display format are updated with the edits made to the selected adornment, processing continues to block 718 where process 700 ends.

Figure 8:
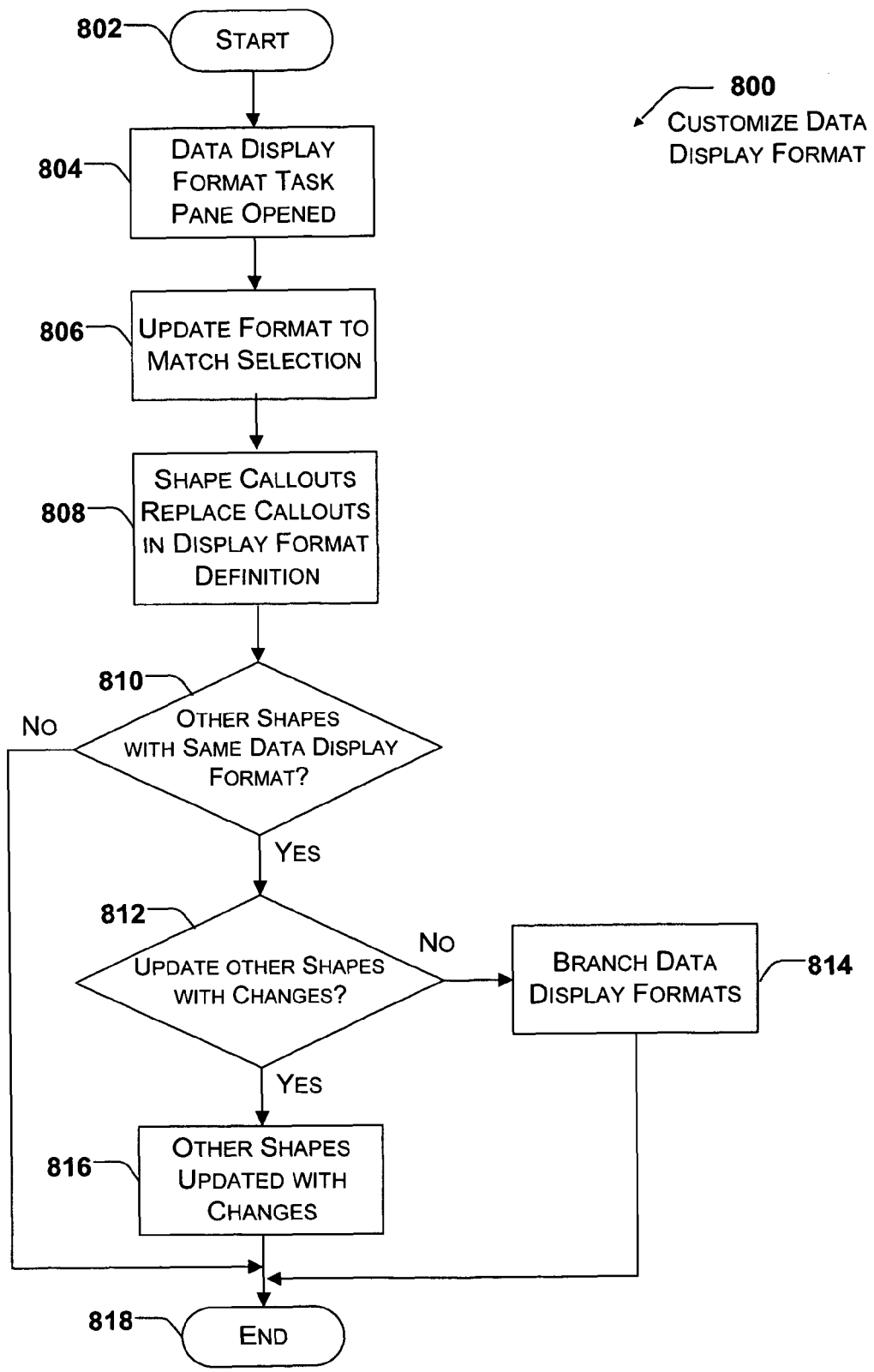
FIG. 8 illustrates a logical flow diagram of an exemplary process for customizing a data display format in accordance with the present invention.

FIG. 8 illustrates a logical flow diagram of an exemplary process for customizing a data display format in accordance with the present invention. Process 800 begins at block 802 where a document is generated with shapes that have one or more associated adornments corresponding to their data display format. Processing continues at block 804.

At block 804, the data display format task pane is opened to assist with the customizing process. In one embodiment, the data display format task pane is similar to data display format task pane 404 shown in FIG. 4. Processing continues at block 806.

At block 806, a selected format in the data display format task pane is updated or edited to reflect a desired or selected data display format. If the changes to the data display format result in the data display format not matching any Standard format, then the newly generated data display format is a Custom format. A number of factors about an existing data display format may be edited from the substance, order and type of format, to the orientation associated with the selected data display format. Once the data display format is updated, processing continues at block 808.

At block 808, any callouts associated with the selected data display format are replaced in the display format definition of the data display format. Replacing the callouts ensures that the adornments reflect that the data display format has been customized. Processing then moves to decision block 810.

At decision block 810, a determination is made whether any other shapes have the same data display format as the shape before its data display format was customized. If no other shapes have the same data display format, then processing advances to block 818 where process 800 ends. However, if other shapes do have the same data display format, then processing continues to decision block 812.

At decision block 812, a determination is made whether the other shapes having the same data display format should be updated with the customized data display format. For example, a dialogue may open that asks the user whether they desire to have the customized data display format applied to the other shapes previously sharing the same data display format. If it is determined that the customized data display format is not be applied to the other shapes, processing moves to block 814 where a new data display format is generated that branches away from the previous data display format. The data display formats are logically separated to store the newly customized data display format and to signify the difference between shapes included in the document that previously had the same data display format. Once the data display formats are logically separated, processing continues to block 818 where process 800 ends.

Alternatively, if it is determined that the customized data display format should be applied to the other shapes previously sharing the same data display format, then processing continues at block 816 where the other shapes are updated with the edits. The other shapes are then updated with the customized data display format. Once the other shapes previously having the same data display format are updated with the customized data display format, processing continues to block 818 where process 800 ends.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for adorning shapes, the computer-implemented method comprising:

obtaining a diagram document from a diagramming application, wherein the diagram document includes diagram shapes, wherein each of the diagram shapes includes a shape description;

importing value data, by the diagramming application, into a cache of the diagram application from a store of data of a source application different than the diagramming application, wherein the value data is organized by types, and wherein the value data imported into the cache of the diagram document is linked to the values in the store of data of the source application to provide synchronization between the store of data of the source application and the cache of the diagram document;

upon importing the value data into the cache of the diagram application, searching the types within the cache to determine any types of the value data that match the shape descriptions of the diagram shapes;

receiving a selection to display an initial adornment object with an initial diagram shape within the diagram document;

populating the initial adornment object with the value data in the cache that is implicated by any match of the type to the shape descriptions;

displaying the initial adornment object in the diagram application according to a display format;

identifying other diagram shapes within the diagramming application that include a same shape description as the shape description of the initial diagram shape;

in response to identifying other diagram shapes within the diagramming application that includes a same shape description as the shape description of the initial diagram shape, displaying other adornment objects for the other diagram shapes, wherein the other adornment objects have the same display format as the initial adornment object; and upon receiving a modification of the value data in the store of data of the source application, automatically synchronizing the value data to the cache and, from the synchronized cache, automatically updating at least one member of a group comprising: the display of the initial adornment object and the display of the other adornment objects.

2. The computer-implemented method of claim 1, wherein the display format is a text based call out shape that is populated with text value data associated with the value data from the source application, wherein the text based call out shape is a separate object from the diagram shapes.

3. The computer-implemented method of claim 1, wherein the display format is a color by value format, wherein the color populates at least one member of a group comprising: the initial diagram shape and the other diagram shapes, wherein the color is determined by a value of the imported value data.

4. The computer-implemented method of claim 1, wherein the display format is a graphic based call out shape that is populated with a value of the value data from the source application, wherein the value is represented by a fill level of the shape.

5. The computer-implemented method of claim 1, wherein the display format is an icon set, wherein, based on the value data from the source application, an icon from the icon set is populated to at least one member of a group comprising: the initial diagram shape and the other diagram shapes, wherein the icon from the icon set indicates a value from the source application.

6. The computer-implemented method of claim 1, wherein the diagram document is displayed within a first pane of the diagram application, wherein display format options are displayed in a second pane of the diagram application, wherein source data is displayed in a third pane of the diagram application.

7. A computer-readable storage medium having computer-executable instructions for adorning shapes, the instructions comprising:

obtaining a diagram document from a diagramming application, wherein the diagram document includes diagram shapes, wherein each of the diagram shapes includes a shape description;

importing value data into the diagramming application from a store of data a source application different than the diagramming application, wherein the value data is organized by types, and wherein the value data imported into the cache of the diagram application is linked to the values in the store of data of the source application to provide synchronization between the store of data of the source application and the cache of the diagram application;

upon importing the value data into the cache of the diagram application, searching the types within the cache to determine any types of the value data that match the shape descriptions of the diagram shapes;

receiving a selection to display an initial adornment object with an initial diagram shape within the diagram document;

populating the initial adornment object with the value data in the cache that is implicated by any match of the type to the shape descriptions;

displaying the initial adornment object in the diagram application according to a display format;

identifying other diagram shapes within the diagramming application that include a same shape description as the shape description of the initial diagram shape; and in response to identifying other diagram shapes within the diagramming application that include a same shape description as the shape description of the initial diagram shape, generating other adornment objects for the other diagram shapes, wherein the other adornment objects have the same display format as the initial adornment object, wherein the other adornment objects include different information from the cache than the initial adornment object.

8. The computer-readable storage medium of claim 7, wherein a modification to the data in the source application is automatically updated to at least one member of a group comprising: the information populated in the initial adornment objection and the information included in the other adornment objects.

9. The computer-readable storage medium of claim 7, wherein the display format is a text based call out shape that is populated with text value data associated with the value data from the source application, wherein the text based call out shape is a separate object from the diagram shapes.

10. The computer-readable storage medium of claim 7, wherein the display format is a color by value format, wherein the color populates at least one member of a group comprising: the initial diagram shape and the other diagram shapes, wherein the color is determined by a value of the imported value data.

11. The computer-readable storage medium of claim 7, wherein the display format is a graphic based call out shape that is populated with a value of the value data from the source application, wherein the value is represented by a fill level of the shape.

12. The computer-readable storage medium of claim 7, wherein the display format is an icon set, wherein, based on the value data from the source application, an icon from the icon set is populated to at least one member of a group comprising: the initial diagram shape and the other diagram shapes, wherein the icon from the icon set indicates a value from the source application.

13. The computer-readable storage medium of claim 7, wherein the diagram document is displayed within a first pane of the diagram application, wherein display format options are displayed in a second pane of the diagram application, wherein source data is displayed in a third pane of the diagram application.

14. A system for adorning shapes, the system comprising:
a processor; and
a memory having computer-executable instructions stored thereon, the computer-executable instructions being configured for:
obtaining a diagram document from a diagramming application, wherein the diagram document includes diagram shapes, wherein each of the diagram shapes includes a shape description;
importing value data, by the diagramming application, into a cache of the diagram document from a store of data of a source application different than the diagramming application, wherein the value data is organized by types, and wherein the value data imported into the cache of the diagram application is linked to the values in the store of data of the source application to provide synchronization between the store of data of the source application and the cache of the diagram document;
upon importing the value data into the cache of the diagram application, searching the types to determine any types of the value data that match the shape descriptions of the diagram shapes;
displaying an initial adornment object with an initial diagram shape within the diagram document;
populating the initial adornment object with the value data in the cache that is implicated by any match of the type to the shape;
displaying the initial adornment object in the diagram application according to a display format;
identifying other diagram shapes within the diagramming application that include a same shape description as the shape description of the initial diagram shape; and
in response to identifying other diagram shapes within the diagramming application that includes a same shape description as the shape description of the initial diagram shape, displaying other adornment objects for the other diagram shapes, wherein the other adornment objects have the same display format as the initial adornment object.

15. The system of claim 14, wherein a modification to the data in the source application is automatically updated to at least one member of a group comprising: the information populated in the initial adornment objection and the information included in the other adornment objects.

16. The system of claim 14, wherein the display format is at least one member of a group comprising: a text based call out shape that is populated with text associated with the information from the source, a graphic based call out shape that is populated with a value associated with the information from the source, an icon set, and a color by value format.

* * * * *